(12) United States Patent
Harrup et al.

(10) Patent No.: US 7,008,564 B2
(45) Date of Patent: Mar. 7, 2006

(54) CURED COMPOSITE MATERIALS FOR REACTIVE METAL BATTERY ELECTROLYTES

(75) Inventors: Mason K. Harrup, Idaho Falls, ID (US); Frederick F. Stewart, Idaho Falls, ID (US); Eric S. Peterson, Idaho Falls, ID (US)

(73) Assignee: Battelle Energy Alliance, LLC, Idaho Falls, OH (US)

( * ) Notice: Subject to any disclaimer, the term of this patent is extended or adjusted under 35 U.S.C. 154(b) by 450 days.

(21) Appl. No.: 10/194,376

(22) Filed: Jul. 11, 2002

(65) Prior Publication Data

US 2004/0009404 A1    Jan. 15, 2004

(51) Int. Cl.
*H01M 6/18*    (2006.01)
*H01B 1/20*    (2006.01)

(52) U.S. Cl. .................. 252/511; 252/500; 252/510; 252/519.3; 252/521.3; 429/315; 429/313

(58) Field of Classification Search ............... 252/500, 252/511, 62.2, 510, 519.2, 521.3; 429/315, 429/192, 313; 522/166
See application file for complete search history.

(56) References Cited

U.S. PATENT DOCUMENTS

| | | | |
|---|---|---|---|
| 4,722,877 A | | 2/1988 | Sammells |
| 5,061,581 A | | 10/1991 | Narang et al. |
| 5,166,009 A | * | 11/1992 | Abraham et al. ............ 429/312 |
| 5,190,698 A | * | 3/1993 | Coltrain et al. ......... 252/519.33 |
| 5,219,679 A | | 6/1993 | Abraham et al. |
| 5,414,025 A | * | 5/1995 | Allcock et al. ............... 522/46 |
| 5,567,783 A | | 10/1996 | Allcock et al. |
| 5,609,974 A | | 3/1997 | Sun |
| H1666 H | | 7/1997 | Stenger-Smith et al. |
| 5,965,299 A | * | 10/1999 | Khan et al. .................. 429/313 |
| 6,020,087 A | | 2/2000 | Gao |
| 6,146,787 A | * | 11/2000 | Harrup et al. ............... 429/119 |
| 6,190,806 B1 | | 2/2001 | Kumar et al. |
| 6,201,100 B1 | | 3/2001 | Gorkovenko et al. |

FOREIGN PATENT DOCUMENTS

JP    07-320782 A  * 12/1995

OTHER PUBLICATIONS

Coltrain et al, "Polyphosphazene Molecular Composites-1, In-situ Polymerization of Tetraethoxisilane," Chem Mater, 1992, 4, 358-364.*

Guglielmi et al, "Poly(organophosphazene)s and Sol-gel Technique," Appl. Organometal. Chem., 1999, 13, 339-351.*

Coltrain et al, "Polyphosphazene Molecular Composites. 1. In situ Polymerization of Tetraethoxysilane," Chem. Mater, 1992, 4, 358-364.*

(Continued)

*Primary Examiner*—Mark Kopec
(74) *Attorney, Agent, or Firm*—Wells St. John, PS

(57) ABSTRACT

A solid molecular composite polymer-based electrolyte is made for batteries, wherein silicate compositing produces a electrolytic polymer with a semi-rigid silicate condensate framework, and then mechanical-stabilization by radiation of the outer surface of the composited material is done to form a durable and non-tacky texture on the electrolyte. The preferred ultraviolet radiation produces this desirable outer surface by creating a thin, shallow skin of crosslinked polymer on the composite material. Preferably, a short-duration of low-medium range ultraviolet radiation is used to crosslink the polymers only a short distance into the polymer, so that the properties of the bulk of the polymer and the bulk of the molecular composite material remain unchanged, but the tough and stable skin formed on the outer surface lends durability and processability to the entire composite material product.

30 Claims, 6 Drawing Sheets

OTHER PUBLICATIONS

Guglielmi et al, "Poly(organophosphazene)s and Sol-Gel Technique," Applied Organometallic chemistry, 1999, 13, pp 339-351.*

Ferrar et al, "Polyphosphazene Molecular Composites," Applied Organometallic Chemistry, 1994, Chapter-20, pp 258-267.*

Ferrar, et al., "Polyphosphazene Molecular Composites", *Appl. Organomental. Chem.*, Chapter 20, 258-267 (1994).

Guglielmi, et al., "Poly(orgaophosphazene)s and the Sol-gel Technique", *Appl. Organometal. Chem.*, Chapter 13, 339-351 (1999).

Novak, "Hybrid Nanocomposite Materials—Between Inorganic Glasses and Organic Polymers," *Advanced Materials*, vol. 5, No. 6, pp. 358-364 (1992).

Coltain, et al., "Polyphosphazene Molecular Composites, I. In Situ Polymerization of Tetraethoxysilane," *Chemical Materials*, vol. 4, No. 2, pp. 358-364 (1992).

Coltrain, et al., "Polyphosphazene Molecular Composites, I. In Situ Polymerization of Tetraethoxysilane," pp. 477-478.

Coltrain, et al., "Polyphosphazene Molecular Composites, II. In Situ Polymerization of Titanium, Zirconium and Aluminum Alkoxides," pp. 266-267.

* cited by examiner

CURED COMPOSITE MATERIALS FOR REACTIVE METAL BATTERY ELECTROLYTES

CONTRACTUAL ORIGIN OF THE INVENTION

The United States Government has rights in the following invention pursuant to Contract No. DE-AC07-99ID13727 between the United States Department of Energy and Bechtel BWXT Idaho, LLC.

BACKGROUND OF THE INVENTION

1. Field of the Invention

This invention relates generally to methods of dimensionally-stabilizing fluid-like elastomeric polymers. More specifically, the invented methods relate to stabilizing composite polymer-ceramic materials for use as solid-state battery electrolytes/separator components, wherein the resulting composite material possesses the high conductivity of a polymer electrolyte and the enhanced durability of a ceramic material. This invention relates to a new molecular composite material for use in all-solid-construction reactive metal batteries. The invented materials are primarily designed for use in either reserve or primary reactive metal/water batteries.

2. Description of Background Art

A battery typically comprises one or more electrochemical cells connected in series, parallel, or both, depending on desired output voltage and capacity. Each cell principally comprises an anode, a cathode, and an electrolyte. The electrolyte serves as the ionic conductor and provides the medium for the transfer of ions inside the cell between the anode and the cathode, and typically comprises liquid, solid, or gel materials. Some batteries, commonly called "primary batteries," are intended for a single use, and, once discharged, are discarded. Other batteries, commonly called "secondary or rechargeable" batteries, are designed to be recharged, after discharge, essentially to their original condition. During discharge, ions from the anode pass through the liquid electrolyte to the electrochemically-active material of the cathode where the ions are taken up with the simultaneous release of electrical energy. During charging, the flow of ions is reversed, so that ions pass from the electrochemically-active cathode material through the electrolyte and are plated back onto the anode.

Solid polymer electrolytes are useful in numerous applications, such as solid-state batteries, supercapacitors, fuel cells, sensors, electrochromic devices and the like. Solid polymer electrolytes have been proposed in the past for use in such equipment, in place of liquid electrolytes, because they combine in one material the function of electrolyte, separator, and binder for the electrode materials, thereby reducing the complexity of the ultimate structure. The advantages inherent in the use of a solid polymer electrolyte (SPE) are the elimination of possible liquid leakage and prevention of dangerous increases in pressure sometimes occurring when volatile liquid electrolytes are present. Further, such SPEs can be fabricated as thin films, which permit space-efficient batteries to be designed. Also, flexible solid polymer electrolytes can be fabricated, which allow for volume changes in the electrochemical cell without physical degradation of the interfacial contacts.

Significant improvement of solid polymer electrolyte materials, over the materials available in the past, is needed in order for all-solid-state batteries to be commercially useful. New SPE materials must be excellent conductors of ions at ambient temperatures, as high internal resistance is the most pressing problem in SPE batteries today. Current organic SPE systems are poor ion conductors at ambient temperatures and the most common strategy employed to combat this problem is to use small organic molecules as additives. See, for example, Abraham, et al., U.S. Pat. No. 5,219,679. While this strategy does result in increased ion transport, current commercial additives suffer from numerous problems such as flammability, toxicity, and a lack of oxidative stability. However, phosphazenes exhibit many favorable properties including high ion conductivity, oxidative stability, non-flammability and non-toxicity. Recent research has focused on improving the mechanical properties and ion transport abilities of polymeric phosphazenes.

Additional problems with SPEs are low conductivity, low dimensional stability, and the manner in which mobile cations are introduced into the matrix. Current methods for addressing these problems are through the use of fillers and the introduction of ions as low lattice energy salts (e.g. triflates). See, for example, Gao, U.S. Pat. No. 6,020,087.

A number of SPEs have been suggested for use in the prior art such as thin films formed by complexation between lithium salt and linear polyethers. See, for example, Narang, et al., U.S. Pat. No. 5,061,581.

Attempts have been made to improve the ionic conductivity of polymer electrolytes by a selection of new polymeric materials such as cation-conductive phosphazene and siloxane polymers. Other suggestions include the use of the addition of plasticizers to polymer electrolytes to form a gel electrolyte. See, for example, Sun, U.S. Pat. No. 5,609,974. While this procedure does improve ambient temperature conductivity, this is done at the expense of mechanical properties.

Attempts have also been made to improve the dimensional stability of phosphazene films (described by Ferrar et al., Polyphosphazene Molecular Composites, 20, 258–267 (1994)). Ferrar produced an anti-static film with improved dimensional stability while maintaining transparency and negative adhesion. Ferrar was not concerned with ionic conductivity, and said anti-static film did not exhibit sufficient ionic conductivity to serve as a commercially useful electrolyte.

Attempts to obtain polymer electrolytes with high conductivity at room temperature have lead to the study of polymers that are highly flexible and have largely amorphous morphology, because the prevailing theory is that ionic conductivity is facilitated by the large-scale segmental motion of the polymer and that ionic conductivity principally occurs in the amorphous regions of the polymer electrolyte. Crystallinity is understood to restrict polymer segmental motion and significantly reduce conductivity. Consequently, the ionic conductivity of complexes of alkali metal salts with poly(ethyleneoxide) has been observed. Li salt complexes of polymers such as poly[bis(methoxyethoxyethoxy)phosphazene] (MEEP) and poly(ethoxyethoxy-ethoxy-vinyl ether) (described by Guglielmi et al., Appl. Organometal. Chem. 13, 339–351 (1999)), prepared on the basis of these principles, have shown room temperature conductivities of around $10^{-5}$ S/cm. While the ionic conductivities of such polymers at ambient temperatures have fallen within acceptable limits for battery applications, they suffer from physical drawbacks, making them inappropriate for use as electrolytes. MEEP, for example, suffers from very low dimensional stability that prevents its extensive use in battery construction technology. Specifically, MEEP is in the visco-elastic flow regime at ambient temperature, and can therefore flow like a viscous liquid without retaining its form when subjected to an external force.

Allcock et al. (U.S. Pat. No. 5,414,025, issued May 9, 1999) disclose a method of crosslinking of polymeric electrolytes, wherein UV radiation is used to increase the structural integrity of polyorganophosphazenes, including MEEP, by inducing C—H bond cleavage to form C—C bond crosslinks. The involves forming a film of MEEP on glass, irradiating the film at between 220 and 400 nm., and then extracting the swollen gels in tetrahydrofuran. The Allcock et al. methods include adding a photoinitiator to increase the amount of crosslinking. While Allcock et al. teach technology that purposely produces substantially-crosslinked polymer film wherein the crosslinking is present throughout the entire polymer electrolyte. The inventors of the present invention, as well as others in the field, have shown that such crosslinking, which may be called "homogeneous" crosslinking, substantially inhibits lithium ion transport.

In summary, no commercially-useful SPE is known in the prior art. In other words, no SPE is known in the prior art that is a thin film that possesses good mechanical properties, including processability, dimensional stability, and durability, while also possessing appropriate ionic conductivity in the range of $10^{-4}$ S/cm at ambient temperatures and appropriate electrochemical stability.

Therefore, there is still a need for a dimensionally-stable, durable polymer electrolyte for use in several different classes of reactive metal batteries, such as Li/water primary or reserve batteries. There is still a need for a stable, durable electrolyte that exhibits high ionic conductivity, and has good processability by virtue of being less adherent, and intractable than previous polymer-gel electrolyte materials. The present invention addresses these needs.

SUMMARY OF THE INVENTION

The invention comprises methods for stabilizing fluid-like elastomeric polymers for use in batteries as combination electrolyte and separator materials, and also comprises the resulting electrolyte materials and batteries. The invented methods comprise physical stabilization by the formation of molecular composites, wherein a rigid silicate condensate framework supports the bulk of a polymeric electrolyte membrane. Further, the invention comprises forming a thin "skin" of crosslinked polymer on the surface of the molecular composite. The resulting "skinned" molecular composite comprises a ceramic and polymeric structure with specifically-designed asymmetric crosslinking at the outer surface of the composite but no crosslinking in the internal structure. Although the bulk of the molecular composite comprises insignificant, or preferably no, crosslinking, the asymmetric crosslinking at the outer surface of the composite is sufficient to substantially reduce, or preferably eliminate, surface adhesion, to make it easy to handle, store, and further process. The preferred fabrication methods utilize a radiation curing step to form the crosslinked polymer skin, preferably using ultraviolet radiation ("UV") of a limited power density and limited exposure time. Also, preferably, the polymeric constituent of the composite is chosen to possess an aromatic or phenolic component or other component with a high molar extinction coefficient in the UV range, to prevent penetration by the UV deep into the molecular composite, so that the UV radiation results in the invented asymmetrical crosslinking in the polymer component of the molecular composite rather than homogeneous crosslinking throughout the polymer. A high molar extinction coefficient in the UV range means that the component has a strong tendency to absorb UV radiation in the wavelength range effective in producing covalent crosslinkages, ie. <240 nm. The preferred fabrication methods and invented composition of matter may be used to solve mechanical stability problems inherent in prior art polymeric electrolytes, while retaining the high ionic conductivity of a parent polymer. The invented dimensionally-stable composite electrolyte/separator materials may be incorporated into several different classes of reactive metal batteries, either primary or reserve in nature, such as Li/water primary batteries.

Therefore, it is an object of the present invention to provide a method of producing a superior molecular composite SPE with high conductivity and superior physical properties, including high dimensional stability and good adhesion (that is, low or negative adhesion or adherence) while retaining the high conductivity required to act as an effective electrolyte for selected battery applications. It is further an object to provide such a composition of matter, so that the molecular composite exhibits good "processability," that is, it can be easily handled, processed, and stored, without the adhesion and intractability problems of conventional, fluid-like SPEs. It is an object of the invention to provide a molecular composite SPE that is commercially useful and is in the form of a thin film that has good mechanical properties and ionic conductivity in the range of $10^{-4}$ S/cm at ambient temperatures.

DETAILED DESCRIPTION OF THE PREFERRED EMBODIMENTS

Figure 1:
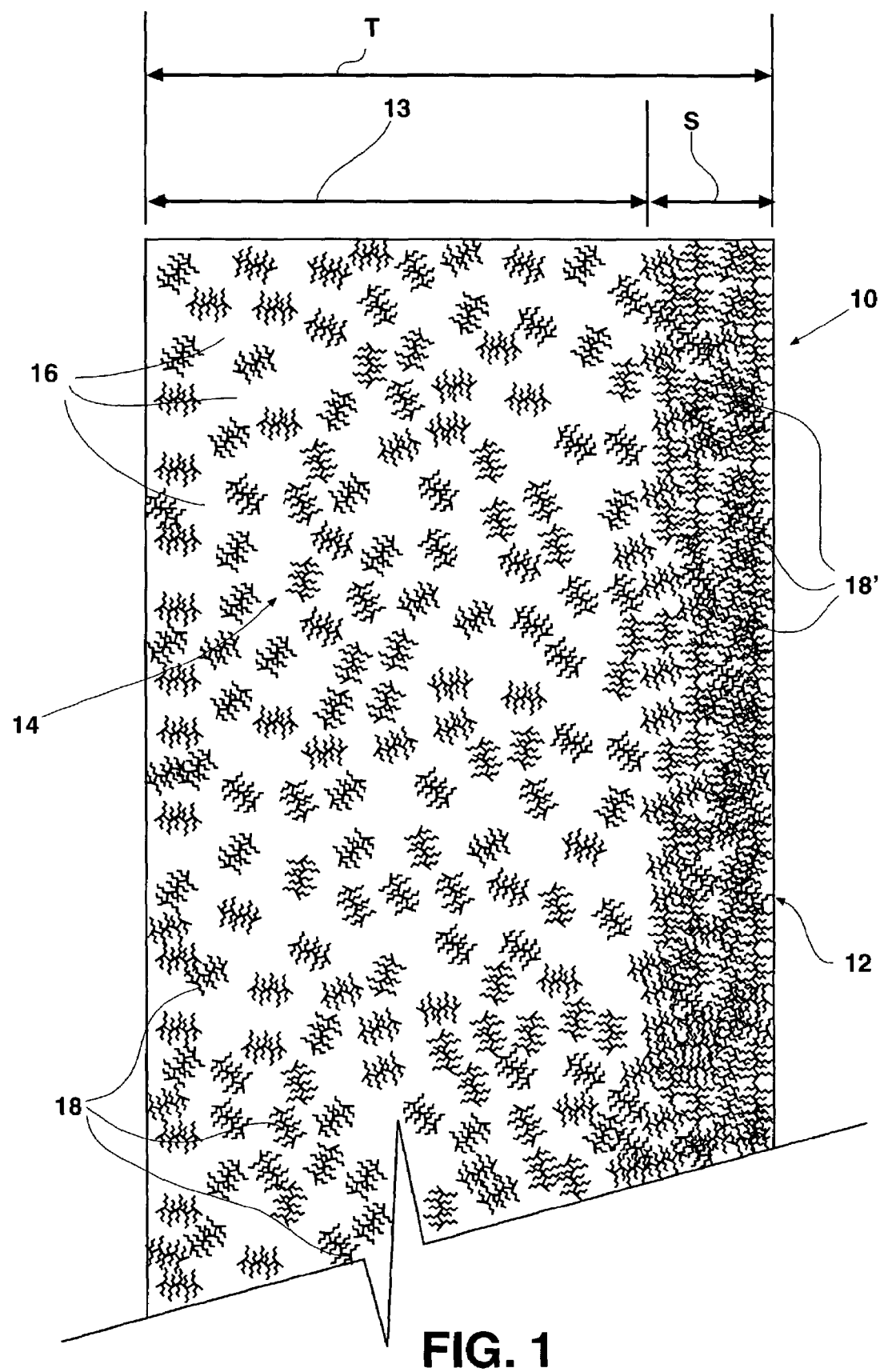
FIG. 1 is a schematic, cross-sectional end view of one embodiment of a solid molecular composite electrolyte according to the invention.

Referring to the Figures, there are shown embodiments of the invented electrolyte and embodiments of battery systems in which the electrolyte may be applied. This invention comprises a method of manufacturing molecular composite materials, preferably polymerceramic materials, for application as solid state battery electrolytes. The invention also comprises composited and "skinned" electrolytes that have dimensionally-stable and non-sticky surface(s) that improve the overall physical characteristics of the electrolyte while maintaining high conductivity.

The polymer-ceramic composite electrolyte material 10 is treated by a radiation curing step or steps, to form a highly-stable outer layer or "skin" portion 12 on the composite material 10 that acts to protect the different physical properties of the bulk portion 14 of the composite product. In other words, the highly-stable crosslinked outer layer, on or near the surface of the molecular composite, acts as a protective layer or barrier over part or all of the molecular composite that makes the product as a whole easily handleable and durable, in spite of the bulk of the composite product having the characteristics of being intractable and tacky in texture. The combination of the cured polymer surface with the composite's preferred semi-rigid silicate condensate framework results in a molecular composite that is dimensionally-stable and easy-to-handle as a whole, even though the interior bulk portion of the polymer is still generally fluid and tacky inside its framework. While contributing superior dimensional stability, durability, and processability to the product as a whole, the highly-stable, non-tacky, non-adhesive, and durable outer layer or portion is of a limited thickness, and preferably only on one side of the composite, so that the high conductivity of the polymer component is substantially preserved.

The invented electrolyte preferably comprises a polymer-ceramic material formed by the catalyzed condensation of a ceramic precursor in the presence of a solvated polymer material. The preferred method comprises providing appropriate ceramic precursors and polymer for condensation into the molecular composite, wherein the ceramic precursors and polymers are appropriate for formation of a thin electrolytic membranes with high conductivity. The selected ceramic precursor is catalytically condensed in-situ with the solvated polymer in a solvent mixture that is miscible with both the polymer and the ceramic precursors. This initial mother liquor is ultrasonically treated for a short time and then formed into a membrane. The membrane then is preferably slowly cured at ambient temperature followed by a heated/vacuum drying step, resulting in a molecular composite 10 comprising a rigid ceramic framework 16 supporting a polymeric membrane 18. Various specific techniques for manufacturing molecular composites from solvated polymer-ceramic precursor mixtures, along this general outline of steps, are known in the prior art.

Once the molecular composite is formed, an additional curing step(s) is performed to alter the physical characteristics of the outer surface of the molecular composite while leaving the bulk of the molecular composite unaffected. The preferred surface-curing step is performed by exposing the electrolyte to UV radiation for a limited time and/or under limited UV frequency and/or power ranges. The preferred polymer(s) are therefore chosen to have properties that react to UV radiation in such a way as to form, under certain conditions, a thin, shallow skin of crosslinked polymer on the outside of the molecular composite.

This skin 12 is preferably the outer layer of the molecular composite, specifically the outer layer of the polymer membrane 18 at the outer surface of the molecular composite 10, that exhibits a high degree of crosslinking of the polymer molecules to themselves, while most of the polymer within the bulk portion 14 of the molecular composite remains un-crosslinked. Thus, the polymers that are substantially crosslinked (18') preferably only occur at or near the outer surface, in other words, not deep into the molecular composite. While the amount of crosslinking may vary within the "skin" layer, for example, ranging from a very high amount of crosslinking at the outer surface of the skin to less crosslinking at the inside of skin, it is preferred that the total depth of polymer comprising substantial crosslinking is only a small fraction of the depth of the molecular composite. Thus, a skin is purposely formed on the electrolyte that has a substantially different amount of crosslinking than the interior bulk portion of the polymerceramic material.

In preferred embodiments, the "surface-cured" electrolyte comprising surface-only crosslinking, exhibits conductivity greater than or equal to 100 $\mu$S/cm at about 20–25° C., preferably in the range of 150–500 $\mu$S/cm or better. In preferred embodiments, the resulting electrolyte maintains dimensional stability, that is, it does not flow, while subjected to pressures exerted upon it in the range of 475–525 g/cm$^2$ at about 20–25° C., wherein it is particularly desirable that the electrolyte not flow at a pressure of 500 g/cm$^2$. Those of skill in the art will understand how the specification of "does not flow" under these pressure ranges is tested and judged. Further, the surface-cured molecular composite, with it's improved texture and amount of tackiness, is well-adapted for further handling, storage, or preferably for direct inclusion in a variety of battery systems.

Figure 2:
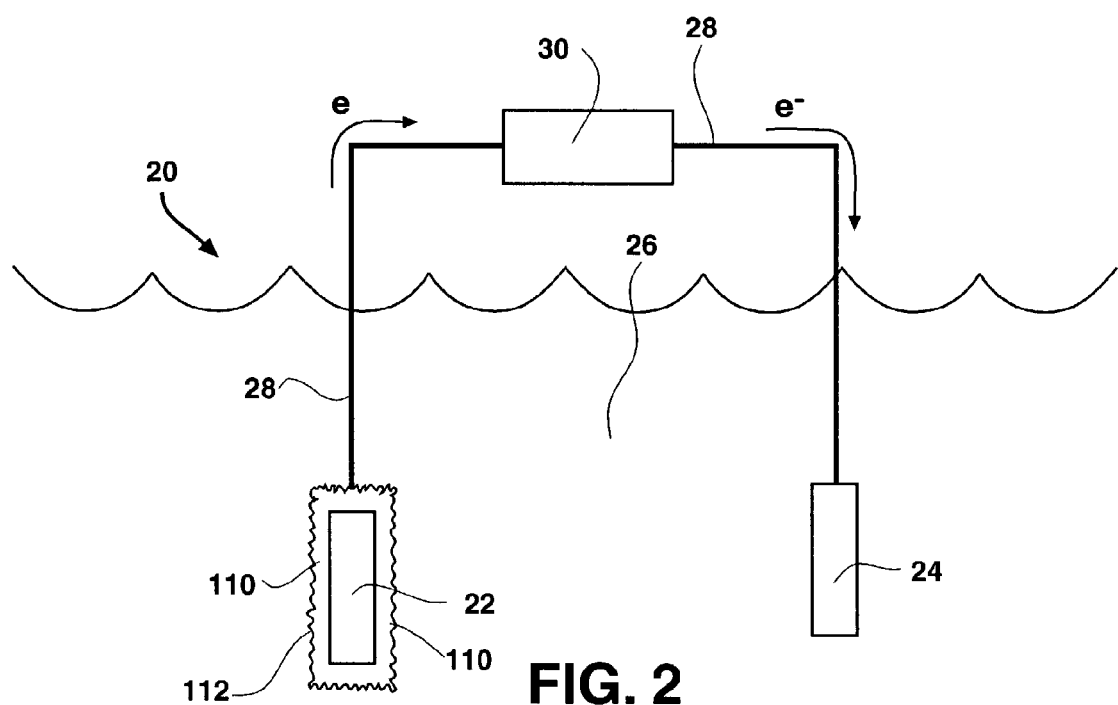
FIG. 2 is a schematic view of one embodiment of a reactive metal-water battery system, which includes one embodiment of a solid molecular composite electrolyte according to the invention.

Batteries made according to embodiments of the invention may include one or more electric-current-producing electrochemical cells, the cells comprising an anode, a cathode, and an electrolyte disposed between the anode and cathode and in ionically-conductive contact with the anode and cathode. In a reactive metal-water battery 20, for example, as in FIG. 2, anode 22 may be a atomic- or alloy-form metal from periodic table Group 1A elements, periodic table Group 2A elements, and mixtures thereof, and preferably, lithium or magnesium. An electrode 24 is placed in the cathode which comprises water 26. The anode 22 may have an electrolyte 110 according to the invention attached to, and in ionically-conductive contact with, the anode outer surface, wherein the outer surface of the electrolyte 110 is the skin portion 112. A conductive line 28 extends between the electrolyte and the electrode 24 in the water cathode 26. Thus, battery discharge occurs through load 30.

Various polymers are envisioned by the inventors as appropriate for inclusion in the invented molecular composite. The preferred polymers comprise UV-absorbing species positioned in the polymer structures to control/limit the penetration of the UV radiation to only the outer portion of the polymer, and, hence, the outer portion of the molecular composite, whereby the polymers in only that outer portion are crosslinked to any significant extent. The especially-preferred polymers are adapted so that the same polymer(s) may be used throughout the molecular composite, wherein added charge-carrying species such as Lithium remain mobile within the un-crosslinked portion of the polymer, for high conductivity at room temperature, while the same polymer, when crosslinked by UV radiation, produces a durable and non-adhesive skin.

Polymers appropriate for the catalyzed condensation process may include, for example, polyphosphazenes, polysiloxanes, and/or mixtures thereof, or other polymers that allow high conductivity while also having components with high molar extinction coefficients in the UV range of radiation, which components are preferably aromatics, phenolics, or substituted versions of these components. Preferred polymer families are the polyphosphazenes, and polysiloxanes, and mixtures thereof, having the UV—high molar extinction coefficient moieties. Polyphosphazenes and all-organic-block polymers with phenolic or aromatic species are examples of polymers expected to exhibit the proper, shallow crosslinking performance upon exposure to UV radiation, while having bulk properties appropriate for application in battery electrolytes. Polyether containing phosphazenes, polythioether containing phosphazenes, polyethers containing polysiloxanes, and polythioether containing polysiloxanes, or mixtures thereof, may be preferred for some battery embodiments. Further, the inventors envision that, in addition to oxo-polymers (—R—O—R—O—R—) and thio-polymers (—R—S—R—S—R—), mixed oxo- and thio-polymers (such as —S—R—O—R— compounds the inventors call "polyetherthiols") may be preferred for some embodiments. Therefore, polyetherthiol containing containing phosphazenes, polyetherthiol containing phosphazenes, polyetherthiol containing polysiloxanes, and polyetherthiol containing polysiloxanes, and mixtures thereof, may be included in embodiments of the invention.

With the preferred polymer composition, little or no ultraviolet radiation travels deep into the molecular composite, because the high-molar-extinction coefficient components absorb the radiation in a shallow outer portion of the composite. Therefore, the UV has little or no effect preferably in $\geq 90\%$ of the molecular composite, resulting in a density of crosslinking in the shallow skin portion rather than crosslinking throughout the bulk composite.

Figure 4:
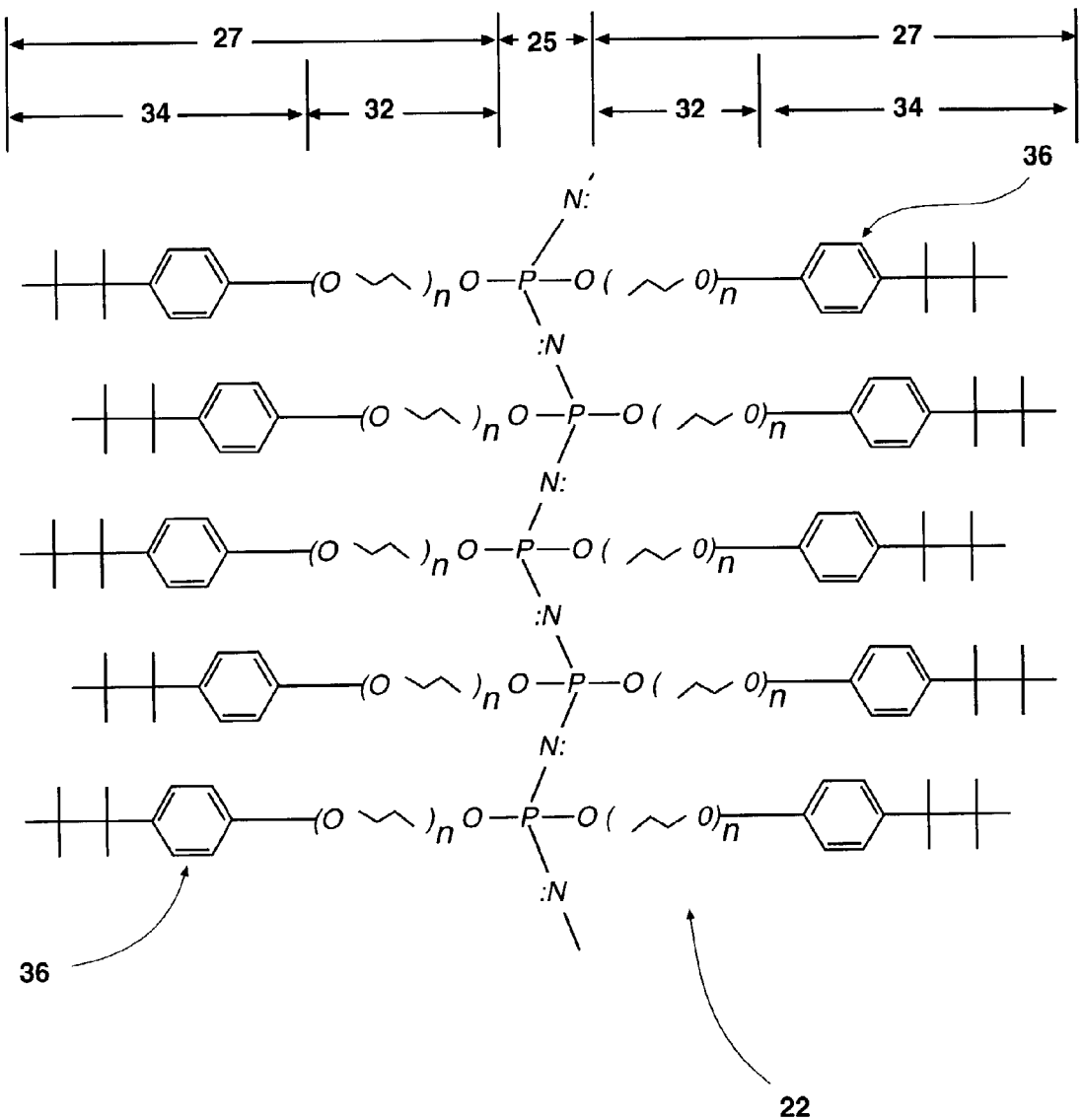
FIG. 4 is a representation of one embodiment of a preferred polymer for inclusion in a skinned molecular composite according to the invention, having a —P=N:—P- backbone.

FIG. 4 illustrates a preferred type of phosphazene 22 comprising a backbone 25 having associated ligands 27 covalently bonded to the backbone. Ligands 27 comprise ion carrying groups 32 (such as ethylene oxy or ethylene thiol groups, or mixed ethylene oxy and thiol groups) surrounding the backbone, which are further surrounded by hydrophobic, UV-light absorbing groups 34 preferably those that contain at least one aromatic moiety (36) per repeat unit, such as a substituted phenolic group. Examples of phosphazenes that may be used are described in U.S. Pat. No. 6,146,787. An especially-preferred phosphazene is based upon the phosphazene backbone, substituted with Triton-X-114™ (Aldrich Chemical Company) as a pendant group, yielding the homopolymer designated "MHT-1" by the inventors (similar to the polymer shown in FIG. 4, except with S in place of the O bonded to the P center).

Figure 5:
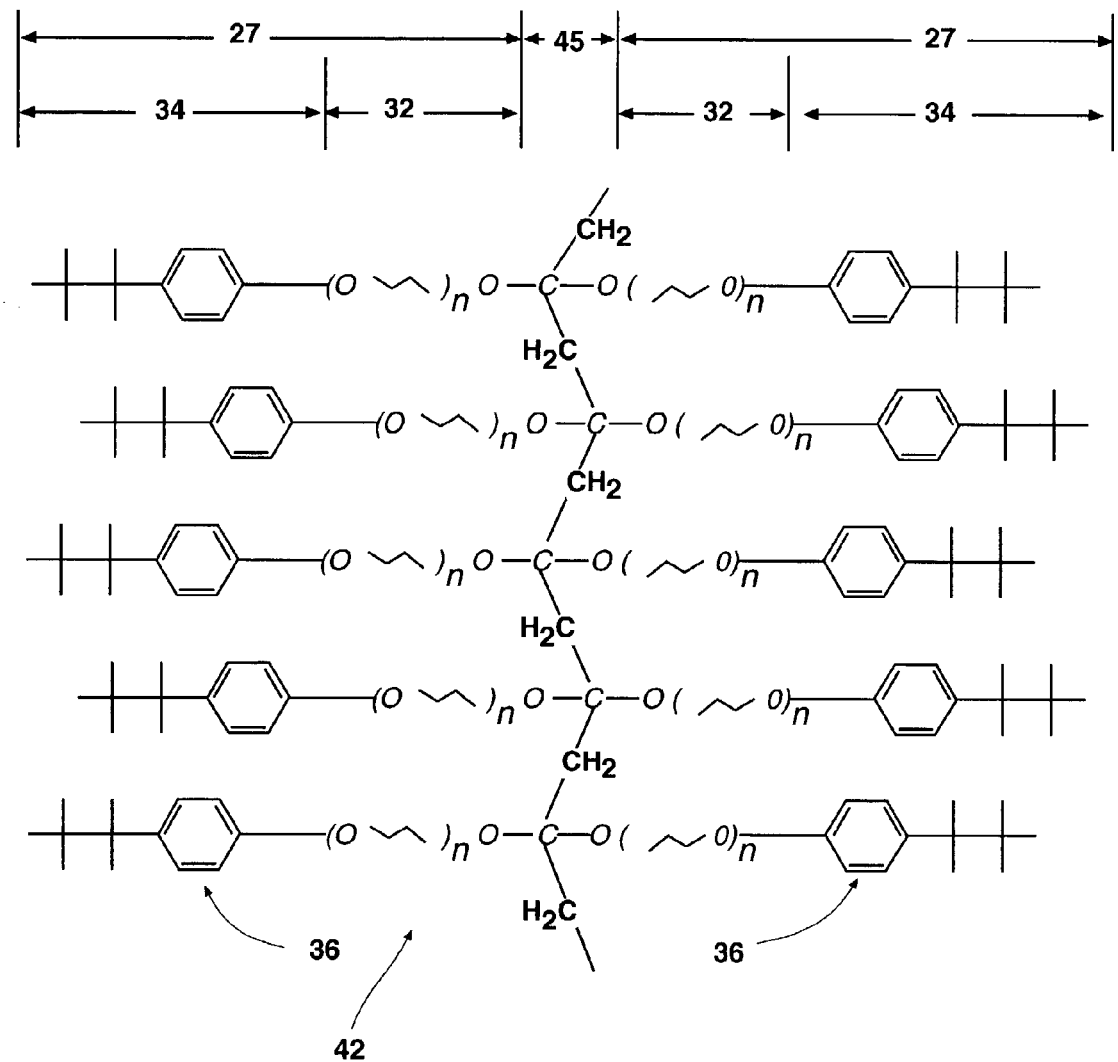
FIG. 5 is a representation of another embodiment of a preferred polymer for inclusion in a skinned molecular composite according to the invention, having an organic backbone.

Alternatively, as illustrated in FIG. 5, an all organic-block co-polymer 42 may be used, which possesses blocks similar or the same as those of the preferred phosphazenes, that is, a backbone 45 surrounded by ion carrying groups 32 (particularly ethylene oxy, ethylene thiol, or mixed ethylene oxy and thiol groups), and further surrounded by hydrophobic, UV-light absorbing groups 34 preferably those that contain at least one aromatic moiety 36 per repeat unit, such as a substituted phenolic group. Crosslinking is affected by the radiation acting on the polymer, and no component is added to the polymer for initiating or effecting crosslinking, that is, no crosslinking initiator is used.

The preferred ceramic precursors for the molecular composite of the invention are ones that are compatible with solvents that dissolve the polymers of the nature described above, for purposes of formation of the initial molecular composite. The ceramic precursor may be a metal alkoxide selected, for example, from silicon alkoxides, titanium alkoxides, zirconium alkoxides, aluminum alkoxides, and/or mixtures thereof. Particularly, tetraethylorthosilicate (TEOS), tetramethylorthosilicate (TMOS), tetraisopropoxyorthotitanate, zirconium n-butoxide butanol complex, zirconium n-butyloxide, aluminum tri-sec butoxide, and/or mixtures thereof are preferred.

Lithium cations, sodium cations, and magnesium cations, or other charge-carrying species are included in the electrolyte. These species may be included according to conventional methods for inclusion of charge-carrying species in electrolytic composite materials.

Once the polymers, ceramic precursors, and charge-carrying species are chosen and the molecular composite is formed, the molecular composite, preferably in a thin membrane form, is irradiated by UV radiation. The outer face of the membrane, preferably the one surface of the membrane exposed after the membrane is attached to an anode or after the membrane is formed in its mold, is irradiated, preferably with low-to-medium intensity ultra-violet radiation, until the desired curing is achieved. The low to medium range radiation comprises a low enough power output to cause crosslinking at the surface but with a minimum of deep radiation penetration, so as to best effect the highly asymmetric crosslinking as a function of depth into the composite, which asymmetric crosslinking is needed to form the skin. Preferably the low to medium radiation frequency is in the range of about 200–400 nm and the power is in the range of about 5–150 Watts power, and, more preferably, in the range of 5–50 Watts.

The radiation step is preferably conducted for only a few hours, for example, less than about three hours, the sufficient time being a dependent function of the nature of the UV-absorbing species within a given polymer and the intensity of the UV photonic flux. Preferably, UV radiation typically in the range of 200–400 nm is used for a short duration, for example, 20–120 minutes, to provide sufficient but not excessively-deep crosslinking in the polymer. In some applications, this basic procedure may be supplemented by additional steps to render the material practical for particular uses.

The preferred crosslinking at/near the outer surface of the polymer material in this invention may be characterized as the conversion of C—H bonds on the polymer component to C—C linkages by means of radiation-induced homolytic cleavage and subsequent radical-radical coupling. Preferably, the this comprises crosslinking of alkyl or allyl groups from different polymer chains.

Figure 6:
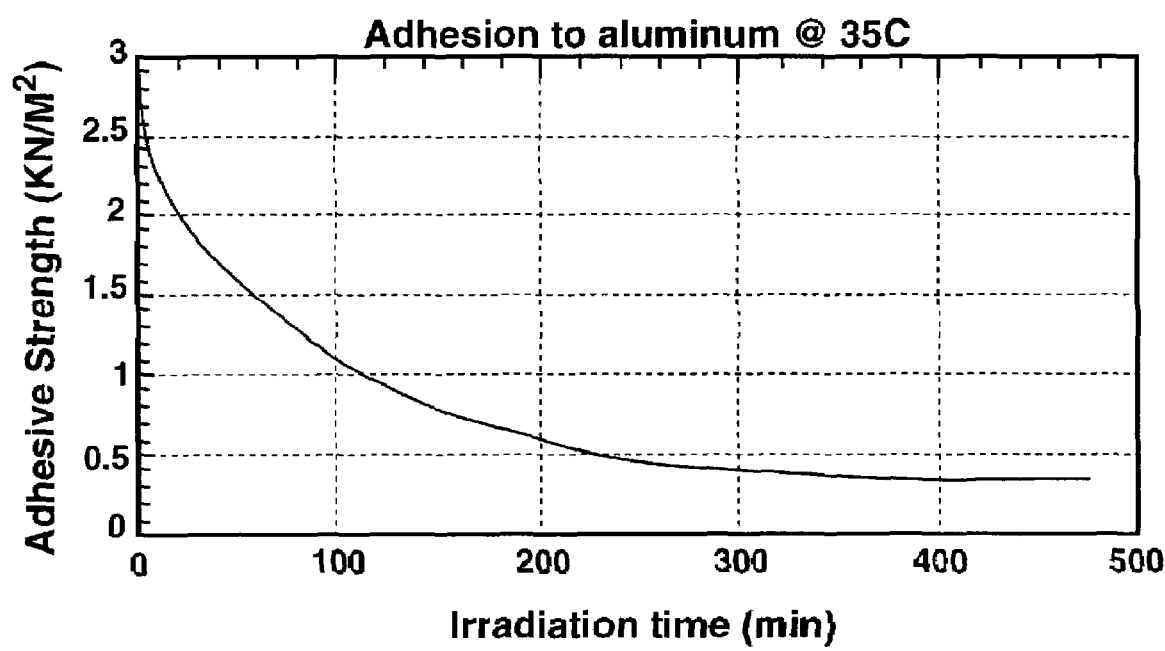
FIG. 6 is a plot of Adhesive Strength vs. Irradiation Time according to embodiments of the invention for the outer "skinned" surface of the composite.

Physical measurement of this crosslinking is easily done by Dynamic Mechanical Analysis (DMA), wherein the reduction of adhesion to a given surface (typically metal surfaces) is quantified and correlated to total UV dosage, as shown in FIG. 6. Thus, one may see the effect of radiation-curing according to the invention by viewing the important property of surface adhesion to an object, which also herein is called the "adhesiveness" of the surface, the reduction of which relates closely to how easily the molecular composite is handled, further processes if desired, and stored. In FIG. 6, adhesive strength in $KN/M^2$ is plotted vs. irradiation time in minutes for adhesion to aluminum at 35° C., for various examples of UV radiation curing of molecular composite made of MHT-1 polymer (similar to FIG. 4, with S in place of the O bonded to the P center) and TEOS. The irradiation was performed by a 100 W Hg lamp from Oriel Instrument Company. While adhesive strength of the "skinned" outer surface of the molecular composite rapidly declines vs. irradiation time, adhesion to the aluminum of uncrosslinked surfaces of the molecular composite (for example, a rear surface of the composite opposite the front, irradiated surface) remained unchanged regardless of time of irradiation of the front surface.

From FIG. 6, one may understand that the adhesion at "time zero" is generally the adhesion of the surface and of generally the entire bulk of the polymer before any radiation. During radiation, the bulk retains that initial adhesion, if it were exposed for measurement, but the surface adhesion declines. Adhesion reduction from greater than 2.5 $KN/M^2$ to about 1 $KN/M^2$ is rapid during the first approximately 100 minutes of radiation, and a more gradual reduction to about 0.5 KN/M² occurs from 100 minutes to several hundred minutes. In general, the preferred embodiments of the invention reduce adhesion of the electrolyte surface, as measured in this type of test by at least 50%, and preferably by at least 75%. Preferably, in the aluminum adhesion test at 35° C., the radiation-cured surface exhibits less than about 1 KN/M² while the bulk portion would continue to exhibit greater than 2 KN/M². The curve shown in FIG. 6 illustrates that irradiation may be conducted for less than about 200 minutes, as the adhesion reduction benefit thereafter is minimal but, undesirably, crosslinking may increase thereafter in the bulk molecular composite. More preferably, irradiation is conducted for about 30–100 minutes at the conditions for the FIG. 6 examples.

The preferred electrolyte made according to preferred methods has a crosslinked layer only equal to about 1%–20% of its thickness, preferably only about 2–10% and most preferably, about 2–3% of its thickness. The crosslinked skin is preferably highly crosslinked, and a steep crosslink density gradient exists in the molecular composite, starting at substantially crosslinked at the outer surface of the molecular composite, and approaching zero crosslinked density rapidly vs. distance into the molecular composite. The outer face of the composite, once sufficiently skinned by crosslinking, is no longer significantly adhesive, that is, adhesion reduced by preferably about 50%, or adhesion reduced below about 1.5 KN/M2, and more preferably below about 1.0 KN/M2, in the aluminum adhesion test at about 35° C. The polymer in the bulk of the composite is substantially or completely un-crosslinked, and so is more fluid than the skin and is more highly conductive. With such a fluid polymer through preferably at least 80% of the thickness of the composite, or preferably 90–99% and most preferably 97–98% of the thickness of the composite, conductivity of the molecular composite is maintained overall at a high and commercially beneficial level.

For example, as illustrated in FIG. 1, a molecular composite membrane may have a thickness T in the range of 15–60 μm. Such a membrane of this example thickness preferably may have a UV-crosslinked skin of a thickness S about 0.3–6 μm thick, with the bulk of the molecular composite (having thickness 13) being substantially un-crosslinked, and preferably not at all crosslinked.

Figure 3:
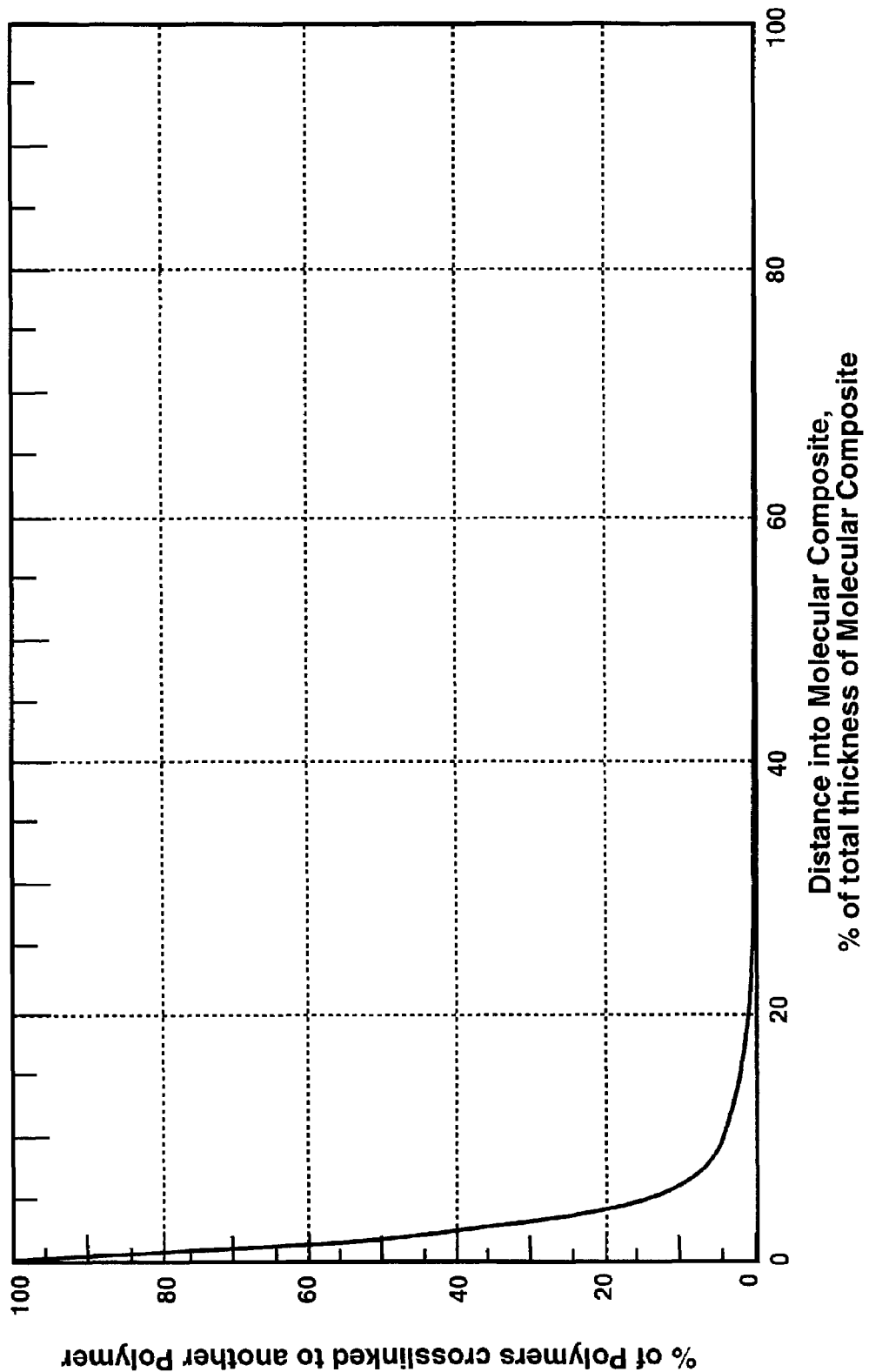
FIG. 3 is a schematic representation of one embodiment of assymetric crosslinking according to the invention, wherein crosslinking drops off dramatically inside of the skin of the molecular composite.

The term "polymer crosslinking" may be understood by one of skill in polymer art to mean occurrences of binding between different polymers chains, for example, as in the preferred embodiment, the formation of C—C bonds converted from two C—H groups, the carbons of which are from different polymer chains. There is expected to be variability in the thickness of the skin and the absolute number of crosslinking bonds in the skin formed by the preferred radiation surface-curing steps, depending upon what polymer(s) is/are chosen, what UV power, UV frequency, and duration are chosen. Regarding the skin, it is expected that at the surface at least 80%, and preferably greater than 90%, of the polymers are crosslinked to at least one other adjacent polymer, and that these crosslinked polymers are crosslinked at a plurality of the C—H sites on each polymer to become C—C sites connecting previously-separate polymers. Given the many potential crosslinking allyl or alkyl C—H sites on each polymer, one may see that such an amount of crosslinking will substantially change the characteristics of the polymers and form a durable skin. Regarding the uncrosslinked interior bulk of the molecular composite, and particularly the uncrosslinked polymer, it is expected that less than about 20% of the polymer chains in this region are crosslinked at one or more C—H sites, more preferably less than about 5%, and most preferably, less than 1%. This steep crosslinking gradient is schematically represented in FIG. 3.

The present invention may be better understood by reference to the following example which is intended for purposes of illustration and is not to be construed as in any way limiting the scope of the present invention, which is defined in the claims appended hereto.

EXAMPLE I

By way of example, one of many embodiments of the invention is described by the following steps. This example illustrates a method for preparing a composite material according to the invention for application to Lithium/water batteries. An appropriate polymer such as poly[bis(phenoxytriethyleneoxy)phosphazene)] is dissolved in a polar solvent, such as tetrahydrofuran (THF), to form a 5–8 wt-% solution of polymer in the solvent. To this solution is added an amount of TEOS equal to the polymer component. A catalytic amount of ammonia is then added to the polymer solution. The polymer solution and ceramic precursor are mixed together, and a lithium salt (such as lithium tetrafluoroborate) is added, for example, at about 6–8 wt-%, and the vessel is tightly sealed, so that no fluid can escape. The mixture is then immediately treated with ultrasonic waves for about thirty minutes. During this time, the condensation of the ceramic proceeds. The composite condensation mixture is then poured into Teflon® molds to form the desired shape and thickness of the molecular composite membrane. The composite material is then slowly dried, to remove solvent, in the molds under controlled conditions, such as 25° C., Argon atmosphere, for one to two days. The dried composite material is then fitted, on one of its surfaces, onto an anode such as a lithium metal strip, and removed from the mold. The remaining exposed surface of the molecular composite membrane is then irradiated at 256 nm (at 8 watts) for four hours to form a "skin" of crosslinked material on that exposed surface. The resulting cured composite membrane, with its already-attached anode, is handleable, non-adhesive, and, when connected to a suitable cathode material, is ready for use. Many effective cathode materials may be chosen, depending on the desired application. The preferred cathode being an inert metallic cathode for water applications, for example, for sea water applications.

Physically stabilizing an electrolytic polymer by preferred compositing techniques tend to reduce conductivity performance by about 2–3 times. That is, the inventor's have seen that conductivity of a molecular composite is about ½ to ⅓ of the conductivity of the electrolytic polymer before compositing. The effect of a further step of skinning the molecular composite according to methods of this invention, however, produces nearly negligible reduction of the conductivity. Therefore, the combination of molecular compositing plus the invented skinning methods produce a composition with substantially the same conductivity as the molecular composite, while producing the superior outer surface physical properties of being more tractable and having less detrimental surface adhesiveness than un-crosslinked molecular composite. In the region of high crosslink density (the skin), ion transport is most likely significantly reduced. However, by minimizing the total thickness of the skin, the physical modification needed to produce a practical battery is achieved, while simultaneously reducing the electrical performance as little as possible. Under the skin, in the bulk of the molecular composite, polymer segmental motion and ion transport are unaffected, or substantially unaffected, by the radiation, and so the bulk of the molecular composite retains its original high performance.

In this Description, the term ambient temperature as used herein describes temperatures in the range from about 15° C. to about 45° C., preferably temperatures in the range from about 18° C. to about 35° C. and more preferably temperatures in the range from about 20° C. to about 25° C.

While the above example illustrates some of the possible fabrication steps and conditions, many variations exist within the broad scope of the preferred combination of silicate compositing and UV "skin" formation. The many variations allow the invention to formulate the appropriate material properties depending on performance specifications for a particular membrane, battery, or other application. Therefore, although this invention has been described above with reference to particular means, materials and embodiments, it is to be understood that the invention is not limited to these disclosed particulars, but extends instead to all equivalents within the scope of the following claims.

What is claimed is:

1. A molecular composite electrolyte material comprising: a ceramic framework, an electrolytic polymeric material contained within said ceramic framework, and a charge-carrying species contained within said polymeric material;

wherein the electrolytic polymeric material is non-homogenous and has an outer surface, an interior bulk portion, and a skin portion at or near said outer surface, said skin portion substantially being comprised of crosslinked polymers and the bulk portion substantially being comprised of un-crosslinked polymers, the interior bulk portion having greater conductivity than the skin portion.

2. A molecular composite electrolyte material as in claim 1, wherein the crosslinked polymers in said skin portion are crosslinked by exposure to UV radiation.

3. A molecular composite electrolyte material as in claim 2, wherein the crosslinked polymers in said skin portion comprise one or more components that have high molar extinction coefficients in an ultraviolet range of radiation, so that substantially no ultraviolet radiation penetrates into the bulk portion.

4. A molecular composite electrolyte material as in claim 3, wherein said crosslinked polymers in said skin portion comprise a component selected from the group consisting of an aromatic component and a phenolic component.

5. A molecular composite electrolyte material as in claim 1, wherein the crosslinked polymers in said skin portion comprise crosslinking of alkyl or allyl groups.

6. A molecular composite electrolyte material as in claim 3, wherein the polymeric material comprises polymers selected from the group consisting of polyphosphazenes, polysiloxanes and mixtures thereof.

7. A molecular composite electrolyte material as in claim 3, wherein the electrolytic polymeric material comprises a material selected from the group consisting of: polyether containing phosphazenes, polythioether containing phosphazenes, polyethers containing polysiloxanes, polythioether containing polysiloxanes, polyetherthiol containing phosphazenes, polyetherthiol containing polysiloxanes, and mixtures thereof.

8. A molecular composite electrolyte material as in claim 1, wherein the electrolytic polymeric material has a thickness and the skin portion has a thickness equal to about 2–10% of the electrolytic polymeric material thickness.

9. A molecular composite electrolyte material as in claim 1, wherein the electrolytic polymeric material has a thickness and the skin portion has a thickness equal to about 2–3% of the electrolytic polymeric material thickness.

10. A molecular composite electrolyte material as in claim 1, said electrolytic polymer material comprises one or more polymers comprising a backbone and ligands bonded to the backbone, said ligands comprising an ion carrying group and a hydrophobic, UV-light absorbing group, wherein said hydrophobic, UV-absorbing group comprises at least one moiety selected from the group consisting of aromatic moieties and phenolic moieties.

11. A molecular composite electrolyte material as in claim 1, wherein said skin portion substantially being comprised of crosslinked polymers exhibits adhesion to aluminum at 35° C. of less than 1 KN/M$^2$, while said bulk portion exhibits adhesion-to-aluminum at 35° C. of greater than 2 KN/M$^2$.

12. A molecular composite electrolyte material as in claim 1, wherein the electrolytic polymeric material has a thickness and the skin portion has a thickness equal to about 1–20% of the electrolytic polymeric material thickness.

13. A molecular composite electrolyte material as in claim 1, wherein the ceramic comprises a silicate condensate.

14. A battery incorporating the molecular composite electrolyte material of claim 1.

15. A battery incorporating the molecular composite electrolyte material of claim 2.

16. A battery incorporating the molecular composite electrolyte material of claim 3.

17. A battery incorporating the molecular composite electrolyte material of claim 4.

18. A battery incorporating the molecular composite electrolyte material of claim 5.

19. A battery incorporating the molecular composite electrolyte material of claim 6.

20. A battery incorporating the molecular composite electrolyte material of claim 7.

21. A battery incorporating the molecular composite electrolyte material of claim 8.

22. A battery incorporating the molecular composite electrolyte material of claim 9.

23. A battery incorporating the molecular composite electrolyte material of claim 10.

24. A battery incorporating the molecular composite electrolyte material of claim 11.

25. A molecular composite electrolyte material comprising:

a silicate condensate framework, an electrolytic polymeric material contained within said silicate condensate framework, and a charge-carrying species contained within said polymeric material;

wherein the electrolytic polymeric material has an outer surface, an interior bulk portion, and a skin portion at or near said outer surface, said skin portion substantially being comprised of crosslinked polymers to improve dimensional stability of said electrolyte material and to reduce adhesiveness of the electrolytic polymeric material outer surface, and the bulk portion substantially being comprised of un-crosslinked polymers so that conductivity of the electrolytic polymeric material is retained by maintaining polymer segmental motion and charge-carrying species mobility within said bulk portion, the electrolytic polymeric material having a thickness and the skin portion having a thickness equal to about 1–20% of the electrolytic polymeric material thickness.

26. A molecular composite electrolyte material as in claim 25, wherein the skin portion thickness is equal to about 2–10% of the electrolytic polymeric material thickness.

27. A molecular composite electrolyte material as in claim 25, wherein skin portion thickness is equal to about 2–3% of the electrolytic polymeric material thickness.

28. A battery incorporating the molecular composite electrolyte material of claim 25.

29. A battery incorporating the molecular composite electrolyte material of claim 26.

30. A battery incorporating the molecular composite electrolyte material of claim 27.

* * * * *